(12) United States Patent
Enomoto

(10) Patent No.: US 7,832,373 B2
(45) Date of Patent: Nov. 16, 2010

(54) VALVE CONTROL APPARATUS OF INTERNAL COMBUSTION ENGINE

(75) Inventor: Hiroshi Enomoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 12/065,552

(22) PCT Filed: Aug. 30, 2006

(86) PCT No.: PCT/JP2006/317146

§ 371 (c)(1),
(2), (4) Date: Apr. 3, 2008

(87) PCT Pub. No.: WO2007/026789

PCT Pub. Date: Mar. 8, 2007

(65) Prior Publication Data
US 2009/0164106 A1    Jun. 25, 2009

(30) Foreign Application Priority Data
Sep. 2, 2005    (JP)    ............................. 2005-254617

(51) Int. Cl.
*F02D 1/00*    (2006.01)
*F02D 9/08*    (2006.01)
(52) U.S. Cl. .................. 123/336; 123/337; 123/478
(58) Field of Classification Search ................. 123/308, 123/336, 337, 399, 478, 480, 568.16
See application file for complete search history.

(56) References Cited

U.S. PATENT DOCUMENTS

| | | | | |
|---|---|---|---|---|
| 3,921,612 A * | 11/1975 | Aono | .......................... | 123/438 |
| 6,173,685 B1 * | 1/2001 | Sturman | ................... | 123/90.12 |
| 6,609,369 B2 * | 8/2003 | Koehler et al. | ................. | 60/459 |
| 7,406,959 B2 * | 8/2008 | Kondo et al. | ........... | 123/568.21 |
| 2003/0097925 A1 * | 5/2003 | Koehler et al. | ............. | 91/363 R |
| 2004/0098984 A1 * | 5/2004 | Duell et al. | ..................... | 60/431 |
| 2008/0017175 A1 * | 1/2008 | Kondo et al. | ........... | 123/568.19 |

FOREIGN PATENT DOCUMENTS

| | | |
|---|---|---|
| JP | 8 303307 | 11/1996 |
| JP | 2000 320347 | 11/2000 |

(Continued)

*Primary Examiner*—John T Kwon
(74) *Attorney, Agent, or Firm*—Oblon, Spivak, McClelland, Maier & Neustadt, L.L.P.

(57) ABSTRACT

A valve control apparatus of a diesel engine (1) is provided with an EGR valve (30), which is provided in an EGR passage (26) of the engine (1) and varies the flow rate of exhaust gas flowing through a passage (26) by carrying out an opening and closing motion, and an actuator (28), which executes a sticking avoiding operation for dissolving or preventing a sticking of a valve (30) by causing the valve (30) to move to and fro so as to open and close the valve (30) by a predetermined moving amount respectively in one direction and the other direction near a full-close position of the valve (30). The apparatus inhibits the sticking avoiding operation by the actuator (28) when an ignition OFF operation is carried out without starting an operation of the engine (1) after an ignition ON operation is carried out. As a result, it is possible to prevent a useless valve opening and closing motion and achieve power saving.

11 Claims, 8 Drawing Sheets

FOREIGN PATENT DOCUMENTS

| | | |
|---|---|---|
| JP | 2001 107812 | 4/2001 |
| JP | 2001 173464 | 6/2001 |
| JP | 2003 56411 | 2/2003 |
| JP | 2003 314377 | 11/2003 |
| JP | 2004 162665 | 6/2004 |

* cited by examiner

VALVE CONTROL APPARATUS OF INTERNAL COMBUSTION ENGINE

FIELD OF THE INVENTION

The present invention relates to a valve control apparatus provided in an internal combustion engine (hereinafter, also referred to as an engine) mounted to an automobile or the like, and more particularly to an improvement of an operation executed for dissolving or preventing a sticking of a valve caused by deposit or the like.

BACKGROUND OF THE INVENTION

Conventionally, some automobile engines are provided with an exhaust gas recirculation system, which introduces a part of an exhaust gas flowing within an exhaust pipe as exhaust recirculation gas (EGR gas) into an intake pipe, reduces the maximum temperature of combustion in the cylinders by mixing the EGR gas with intake air, and reduces harmful substances (for example, nitrogen oxides) contained in exhaust gas.

The exhaust gas recirculation system is provided with an EGR piping connecting an exhaust system and an intake system of the engine, and an EGR valve provided within the EGR piping. The EGR valve is capable of adjusting an opening degree. In other words, a reflow rate of the EGR gas is adjusted by adjusting the opening degree of the EGR valve.

In this kind of exhaust gas recirculation system, there is a possibility that deposit of a combustion product (oxides or carbides) is deposited within the EGR piping, for example, an exhaust gas reflow path formed within a cylindrical nozzle fitted into a valve housing. Since the deposit is generated from hydrocarbon (HC), carbon (C), oil or the like in the exhaust gas, and has a high viscosity, the deposit collects on an outer peripheral portion of the EGR valve, a drive shaft of the EGR valve, an inner wall surface of the exhaust gas reflow path and the like. Further, when deposit (sediment) collects on a portion between the outer peripheral portion of the EGR valve and the inner wall surface of the reflow path, or collects on a portion between the drive shaft and the inner wall surface of the reflow path, an opening and closing motion of the EGR valve is hindered, and it is impossible to well adjust the opening degree of the EGR valve. Accordingly, there is generated a problem that the EGR gas cannot be fed to the intake pipe, or the proper reflow rate of the EGR gas cannot be obtained. Particularly, in the case where a drive torque for opening and closing the EGR valve is small, or in the case where the opening degree of the EGR valve is controlled in a small angular range, the problem is particularly noticeable.

The following Patent Document 1 has been proposed as a structure for solving the problem. Patent Document 1 discloses a structure for opening and closing an EGR valve at a predetermined opening degree near a valve full-close position at a time when an engine stops. Accordingly, the collected deposit is scraped off by the EGR valve, and the sticking of the EGR valve is dissolved or prevented (hereinafter, this operation is called as "sticking avoiding operation").

Further, the following Patent Document 2 discloses a structure for setting a motor speed low so as to increase a drive torque at a time of executing the "sticking avoiding operation", in the structure carrying out the "sticking avoiding operation" by a stepping motor. Further, Patent Document 2 discloses a structure for starting the "sticking avoiding operation" mentioned above when an ignition switch is turned off, as an execution timing of the "sticking avoiding operation".

However, in the structure which starts the "sticking avoiding operation" when the ignition switch is turned off such as disclosed in Patent Document 2 mentioned above, that is, in the structure which starts the "sticking avoiding operation" in conjunction only with the ignition switch, the following problem occurs.

The sediment of the deposit mentioned above is generated during the operation of the engine. Accordingly, when the engine has been running and stopped immediately before the ignition switch is turned off, it is possible to effectively remove the deposit collected during the operation of the engine, by starting the "sticking avoiding operation". However, in the structure disclosed in Patent Document 2, even when the ignition switch is turned off from a state in which only an ON operation of the ignition switch is carried out, that is, a state in which a starter is not started (the engine is not started), the "sticking avoiding operation" is started. In this condition, the "sticking avoiding operation" is started in spite the fact that the deposit has not collected in the exhaust gas reflow path. In other words, a useless "sticking avoiding operation" is started. The "sticking avoiding operation" generally utilizes an electric motor adjusting the opening degree of the EGR valve. Accordingly, if the "sticking avoiding operation" is started when the ignition switch is turned off without the starter being started after the ON operation of the ignition switch is carried out, useless power consumption is caused. Further, when the ON/OFF operations of the ignition switch are carried out over a number of times, the "sticking avoiding operation" is started each time, and a dissipation of the electric power becomes great.

Further, in the "sticking avoiding operation" mentioned above, an operating sound of the electric motor or the like is generated. If a passenger such as a driver or the like hear the operating sound every time when the ON/OFF operation of the ignition switch (the ON/OFF operation which does not accompany the engine start) is carried out, the passenger feels disturbed.

Further, when the ON/OFF operation of the ignition switch (the operation turning off the ignition switch without starting the starter) is carried out in a condition that the engine is not operated over a long time, the "sticking avoiding operation" is started in a condition that the engine is cold. In the condition that the engine is cold as mentioned above, there is a possibility that the EGR valve is strongly stuck by the deposit which cannot be scraped off by the previous "sticking avoiding operation". If the "sticking avoiding operation" is started under such a condition, the load of the electric motor is significantly increased, and there is a possibility that a service life of the motor is adversely affected.

Patent Document 1: Japanese Laid-Open Patent Publication No. 2004-162665

Patent Document 2: Japanese Laid-Open Patent Publication No. 8-303307

SUMMARY OF THE INVENTION

Accordingly, it is an objective of the present invention to provide a valve control apparatus of an internal combustion engine which prevents useless valve opening and closing motions and achieves a power saving with respect to the valve control apparatus carrying out a control operation dissolving or preventing sticking of a valve by opening and closing the valve at a time when the internal combustion engine stops.

In order to achieve the objective mentioned above, the present invention provides a valve control apparatus provided with a valve, which is provided in a gas passage of an internal combustion engine and varies a flow rate of a gas flowing through the passage by carrying out an opening and closing motion, and a valve actuation unit, which executes a sticking avoiding operation for dissolving or preventing sticking of the valve by causing the valve to move to and fro so as to open and close the valve at predetermined moving amounts respectively in one direction and the other direction near a full-close position of the valve. The apparatus inhibits the sticking avoiding operation by the valve actuation unit when an ignition OFF operation is carried out without starting an operation of the engine after an ignition ON operation is carried out.

Further, the present invention provides a valve control apparatus provided with a valve, which is provided in a gas passage of an internal combustion engine and varies a flow rate of a gas flowing through the passage by carrying out an opening and closing motion, and a valve actuation unit, which executes a sticking avoiding operation dissolving or preventing sticking of the valve by causing the valve to move to and fro so as to open and close the valve at predetermined moving amounts respectively in one direction and the other direction near a full-close position of the valve. The apparatus executes the sticking avoiding operation by the valve actuation unit in conjunction with an ignition OFF operation, only when the sticking avoiding operation has not yet been executed after an operation of the engine is finished.

Further, the present invention provides a valve control apparatus provided with a valve, which is provided in a gas passage of an internal combustion engine and varies a flow rate of a gas flowing through the passage by carrying out an opening and closing motion, and a valve actuation unit, which executes a sticking avoiding operation dissolving or preventing sticking of the valve by causing the valve to move to and fro so as to open and close the valve at predetermined moving amounts respectively in one direction and the other direction near a full-close position of the valve. The apparatus executes the sticking avoiding operation by the valve actuation unit only when an ignition OFF operation is carried out under a condition that a demand flag is in an ON state, and wherein the demand flag comes to the ON state in conjunction with the start of the engine, and comes to the OFF state in conjunction with the end of the sticking avoiding operation.

DETAILED DESCRIPTION OF THE PREFERRED EMBODIMENTS

A description will be given of an embodiment in accordance with the present invention with reference to the accompanying drawings. The present embodiment is described about a case where the present invention is applied to a common rail type in-cylinder direct injection multiple cylinder (for example, four cylinder) diesel engine mounted to a automobile.

—Description of Structure of Engine—

Figure 1:
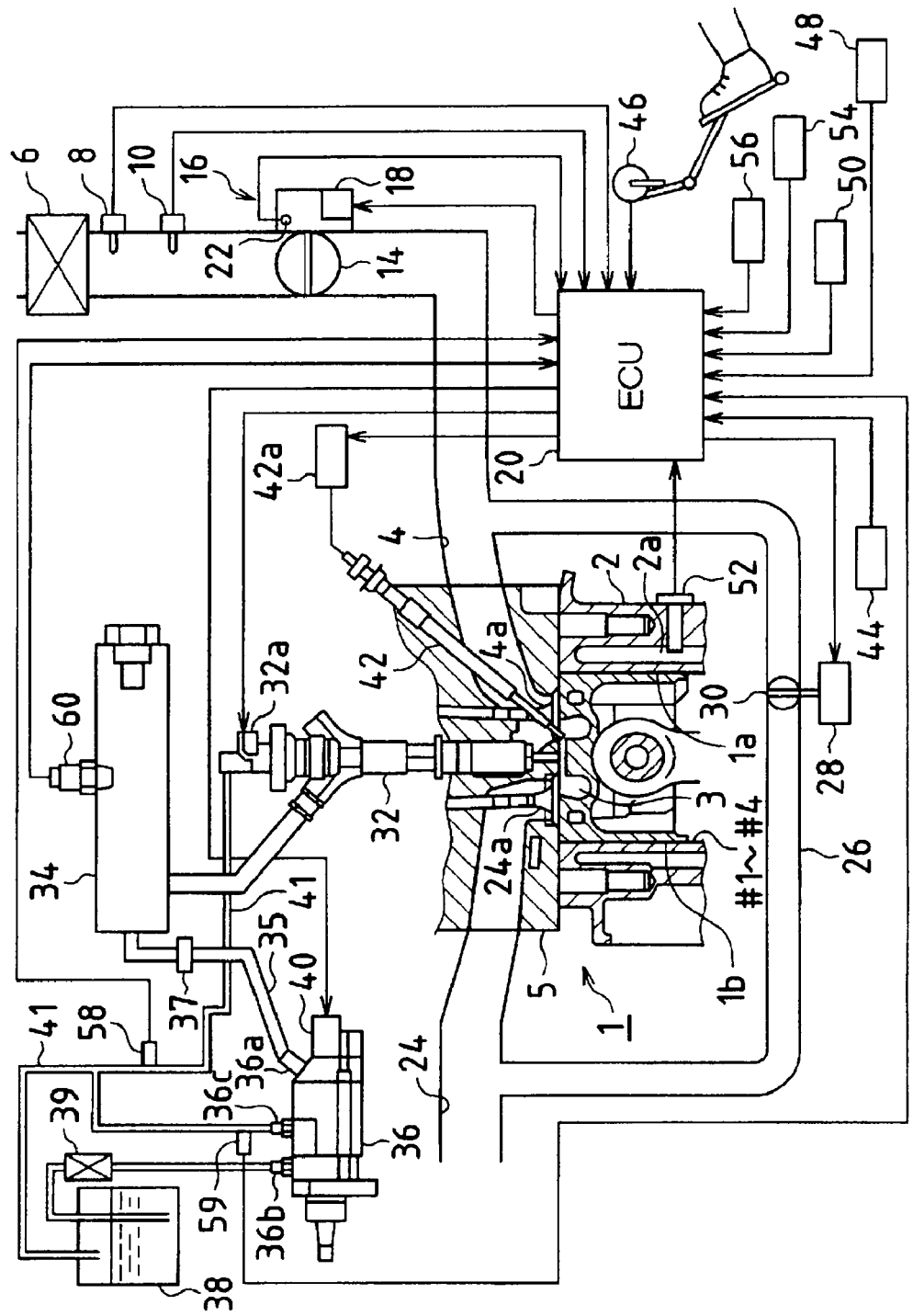
FIG. 1 is a view showing an outline structure of an engine and a control system in accordance with one embodiment.

A description will be first given of an outline structure of the diesel engine (hereinafter, simply referred to as an engine) in accordance with the present embodiment. FIG. 1 is a diagrammatic view of an engine 1 and a control system in accordance with the present embodiment.

An intake passage 4 is connected as an intake system to a combustion chamber 3 defined between a cylinder 1a and a piston 1b of the engine 1 via an intake valve 4a. The intake passage 4 is provided with an air cleaner 6 filtrating intake air, an intake air amount sensor 8 for detecting an intake air amount, an intake air temperature sensor 10 for detecting a temperature of the intake air, and a throttle valve 14 for adjusting the amount of the intake air introduced into the combustion chamber 3, which are aligned in this order from an upstream side.

The throttle valve 14 is driven so as to be opened and closed by a drive mechanism 16. The drive mechanism 16 is provided with a step motor 18, and a gear group coupling the step motor 18 and the throttle valve 14. The step motor 18 is controlled by an electronic control unit (hereinafter, refer to as "ECU") 20 for carrying out various types of control of the engine 1. Further, the drive mechanism 16 is provided with a full-open switch 22 which comes to an ON state when the throttle valve 14 comes to a full-open position.

An exhaust passage 24 is connected as an exhaust system to the combustion chamber 3 via an exhaust valve 24a. An exhaust gas recirculation (EGR) passage 26 is branched from the exhaust passage 24. The EGR passage 26 is connected to a downstream side of the throttle valve 14 in the intake passage 4. The EGR passage 26 is provided with an EGR valve 30 driven so as to be opened and closed by an actuator 28 controlled by the ECU 20. It is possible to freely set the ratio of the amount of the intake air introduced into the combustion chamber 3 and an EGR amount by adjusting the intake air amount by the throttle valve 14 and adjusting the EGR amount by the EGR valve 30, respectively. Accordingly, it is possible to suitably control the intake air amount and the EGR amount over the entire operating range of the engine 1.

The engine 1 is provided with a plurality of cylinders (only one cylinder is illustrated although the present embodiment has four cylinders) #1, #2, #3 and #4, and an injector 32 is arranged in the combustion chamber 3 in each of the cylinders #1 to #4. Fuel injection from the injector 32 to each of the cylinders #1 to #4 of the engine 1 is controlled by turning on and off an injection controlling electromagnetic valve 32a.

The injector 32 is connected to a common rail 34 serving as an accumulator commonly connected to all the cylinders. While the injection controlling electromagnetic valve 32a is open (during an injector valve opening period), the fuel within the common rail 34 is injected into the combustion chamber 3 by the injector 32.

A comparatively high pressure corresponding to a fuel injection pressure is accumulated in the common rail 34. In order to achieve the accumulation, the common rail 34 is connected to a discharge port 36a of a supply pump 36 via a feed piping 35. Further, a check valve 37 is provided in the middle of the feed piping 35. On the basis of an existence of the check valve 37, fuel is fed from the supply pump 36 to the common rail 34, and fuel back flow from the common rail 34 to the supply pump 36 is inhibited.

The supply pump 36 is connected to a fuel tank 38 through a suction port 36b, and a filter 39 is provided in the middle thereof. The supply pump 36 draws the fuel from the fuel tank 38 via the filter 39. Further, the supply pump 36 causes a plunger to reciprocate on the basis of a rotational drive force from a crankshaft, which is an output shaft of the engine 1, increases a fuel pressure to a demanded pressure, and feeds a high-pressure fuel to the common rail 34.

Further, a pressure control valve 40 is provided near the discharge port 36a of the supply pump 36. The pressure control valve 40 is provided for controlling the fuel pressure (that is, an injection pressure) discharged to the common rail 34 from the discharge port 36a. The pressure control valve 40 is opened, whereby an excess fuel at an amount which is not discharged from the discharge port 36a is returned to the fuel tank 38 from a return port 36c provided in the supply pump 36 via a return piping (a return flow path) 41.

As mentioned above, the fuel feed system of the engine 1 is constructed by using the fuel tank 38, the supply pump 36, the common rail 34, and the injector 32 as main constructing members.

Further, a glow plug 42 is arranged in the combustion chamber 3 of the engine 1. The glow plug 42 is a start assisting device which glows by applying an electric current to a glow relay 42a immediately before starting the engine 1, and to which a part of fuel spray is sprayed, whereby ignition and combustion are promoted.

The crankshaft of the engine 1 is provided with a rotor rotating in synchronization with a rotation of the crankshaft, and is provided with a rotation speed sensor 44 constituted by an electromagnetic pickup detecting projections formed on an outer circumferential surface of the rotor so as to output pulse signals corresponding to the rotation speed. An output of the rotation speed sensor 44 is received as a signal contributing to a calculation of the rotation speed of the engine 1 by the ECU 20.

The electronic control unit (ECU) 20 mentioned above is provided with a central processing unit (CPU), a read only memory (ROM), a random access memory (RAM), a backup RAM, a timer, a counter and the like, and is structured such that they are connected to an external input circuit and an external output circuit including an analog/digital (A/D) converter by a bidirectional bus.

The ECU 20 structured as mentioned above inputs detection signals of various types of sensors via the external input circuit, and executes various types of control relating to the operating state of the engine 1 such as a basic control about the fuel injection and the like of the engine 1 on the basis of the signals. Specifically, various forms of information are received by the ECU 20. In addition to intake air amount information detected by the intake air amount sensor 8 mentioned above, and the intake air temperature information detected by the intake air temperature sensor 10, the information includes accelerator pedal position information (accelerator pedal depression amount information) detected by an accelerator pedal position sensor 46, ON/OFF information of an ignition (IG) switch 48, an ON/OFF information of a starter switch 50, coolant temperature information detected by a coolant temperature sensor 52 provided in the water jacket 2a, shift position information detected by a shift position sensor 54 provided in a transmission, vehicle speed information detected through a signal of a vehicle speed sensor 56, fuel temperature information detected by a fuel temperature sensor 58 provided in the return piping 41 extending from the injector 32, fuel temperature information detected by a fuel temperature sensor 59 provided near the return port 36c, fuel pressure (an injection pressure PC) information detected by a fuel pressure sensor 60 provided in the common rail 34 and the like. The ECU 20 executes various types of control relating to the operating state of the engine 1 on the basis of the information.

—Description of EGR Valve Control Apparatus—

Figure 2:
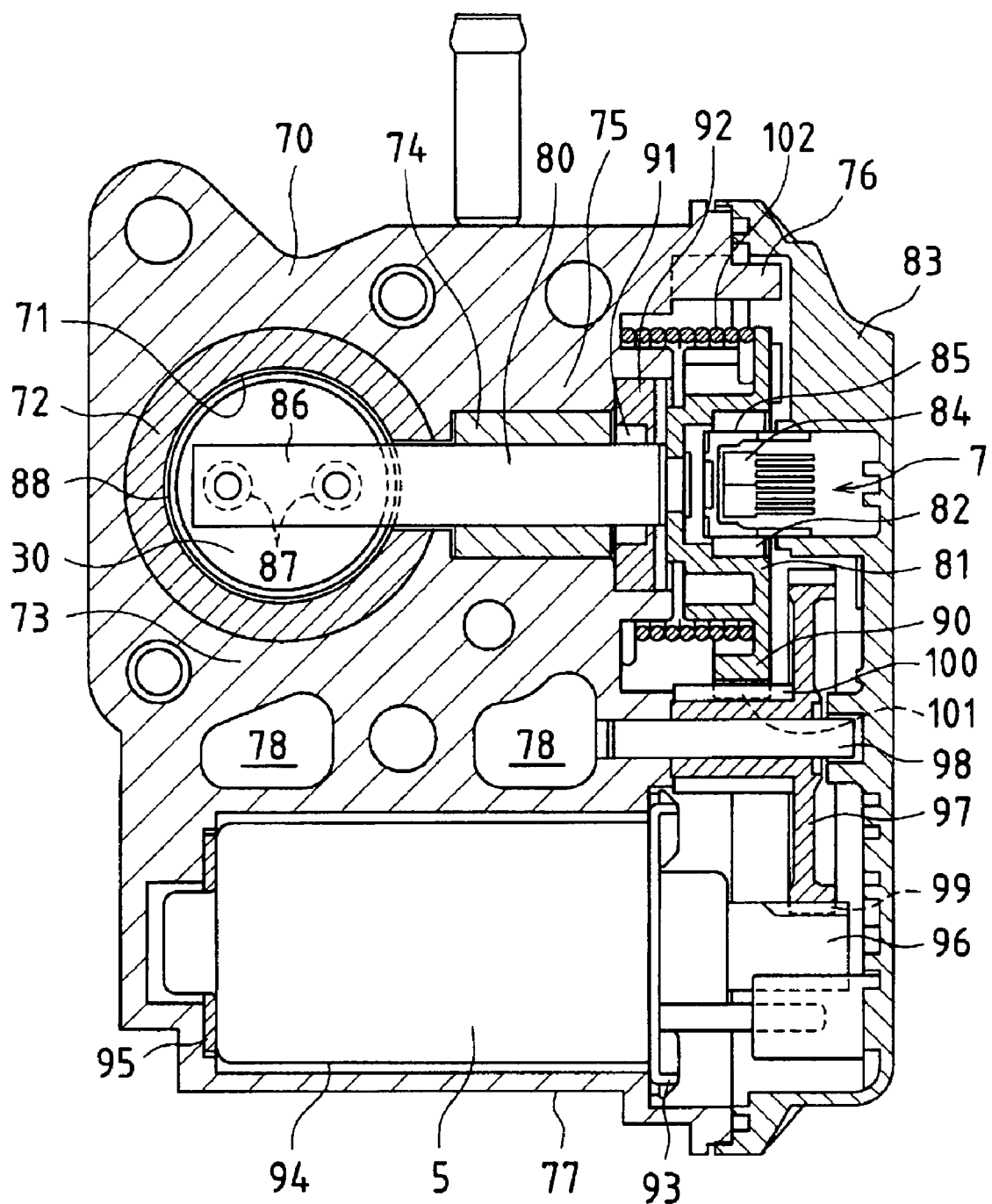
FIG. 2 is a cross-sectional view showing a main structure of an EGR valve control apparatus.
Figure 3:
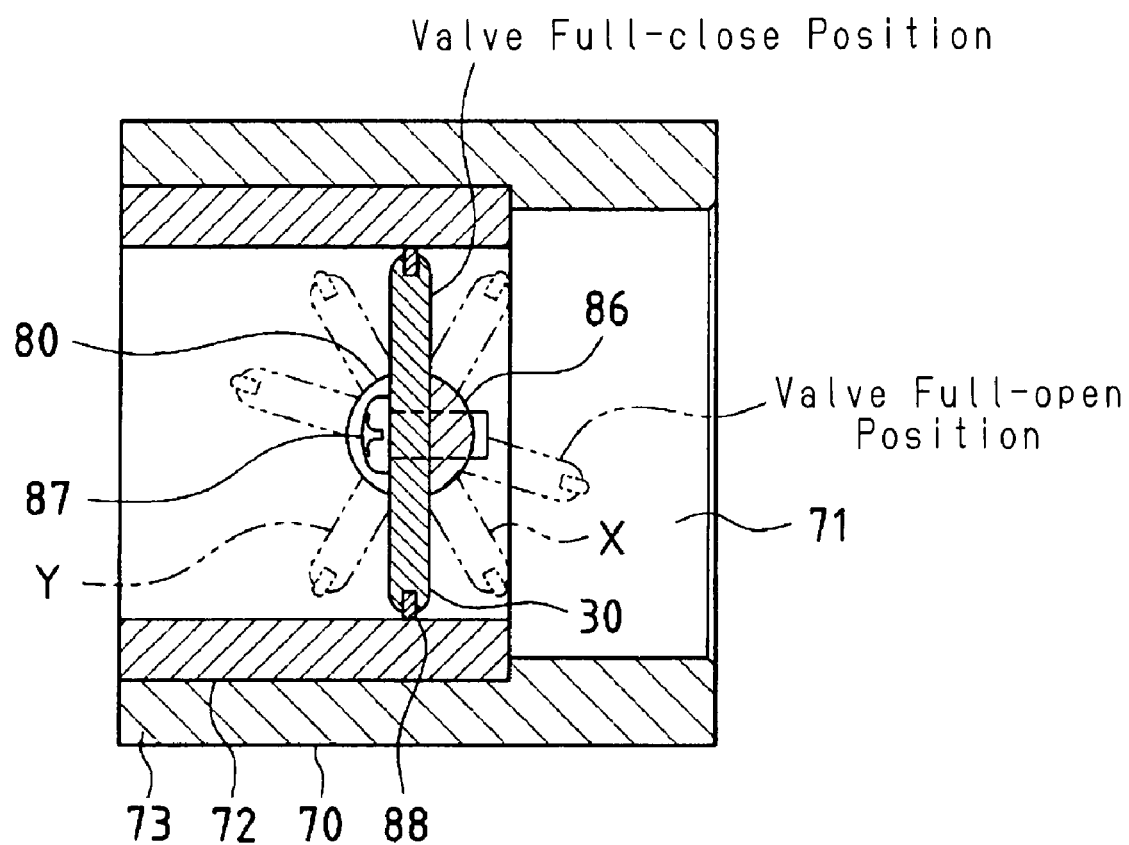
FIG. 3 is a view showing an opening position of the EGR valve.

Next, a description will be given of an EGR valve control apparatus provided with the EGR valve 30 and an actuator (a valve actuation unit) 28 for driving the EGR valve 30. FIG. 2 is a cross-sectional view showing a main structure of the EGR valve control apparatus, and FIG. 3 is a view showing an opened position of the EGR valve 30.

The EGR valve control apparatus in accordance with the present embodiment is provided with a valve housing 70 constructing a part of the EGR passage 26 mentioned above, a cylindrical nozzle 72 fitted to an exhaust gas reflow path 71 formed in the valve housing 70, the EGR valve 30 accommodated within the nozzle 72 so as to be freely opened and closed, a valve shaft 80 integrally rotating with the EGR valve 30, a drive motor 5 driving the valve shaft 80, and a power unit (a detailed structure of which will be described below) having a power transmission mechanism for transmitting rotational power of the drive motor 5 to the valve shaft 80. The power unit is controlled by the ECU 20 mentioned above.

Further, the EGR valve control apparatus is provided with a valve opening degree sensor 7 converting an opening degree of the EGR valve 30 into an electric signal. The valve opening degree sensor 7 transmits a sensor output of an upper limit voltage (for example, 4 V) when the opening degree of the EGR valve 30 is a valve full-open position (a maximum opening degree), and transmits a sensor output of a lower limit voltage value (for example, 1 V) when the opening degree of the EGR valve 30 is a valve full-close position (a minimum opening degree). Further, the valve opening degree sensor 7 is provided with a rotor 81 fixed to a right end portion of the valve shaft 80 in FIG. 2, having an substantially U-shaped cross section and made of an iron-based metal material (a magnetic material), a divided type (substantially polygonal) permanent magnet 82, which is a magnetic field generating source, a divided type (substantially circular arc shaped) yoke (a magnetic material) magnetized by the permanent magnet 82, a plurality of Hall elements 84 integrally arranged in a sensor cover 83 in such a manner as to oppose to the divided type permanent magnet 82, a terminal constituted by a conductive metal thin plate for electrically connecting the Hall element 84 and the ECU 20, and a stator 85 made of an iron metal material (a magnetic material) for concentrating a magnetic flux to the Hall element 84.

The divided type permanent magnet 82 and the divided type yoke are fixed to an inner circumferential surface of the rotor 81, which is insert molded in a reduction gear corresponding to one of the constituting elements of the power transmission mechanism by using an adhesive agent or the like. In the divided type permanent magnet 82, substantially polygonal permanent magnets in which a magnetizing direction is a vertical direction (an upper side is an N pole and a lower side is an S pole) in FIG. 2 are arranged in such a manner that the same pole exists in the same side.

The Hall element 84 is a non-contact type detection element, is arranged so as to oppose to an inner peripheral side of the permanent magnet 82, and is provided such that an electromotive force is generated in response to a magnetic field if the magnetic field of the N pole or the S pole is generated in the sensing surface (positive electric potential is generated if the magnetic field of the N pole is generated, and negative electric potential is generated if the magnetic field of the S pole is generated).

The valve housing 70 is a device retaining the EGR valve 30 within the exhaust gas reflow path 71 formed within the nozzle 72 rotatably in a rotating direction from the valve full-close position to the valve full-open position (refer to FIG. 3), and is fastened and fixed to the exhaust gas reflow pipe by a fastening device such as a bolt or the like. A nozzle fitting portion 73 fitting and retaining the nozzle 72 is integrally formed in the valve housing 70. Further, a shaft bearing portion 75 rotatably supporting one end portion of a valve shaft 80 via a metal bearing (a cantilever bearing) 74 is integrally formed in the nozzle 72 and the nozzle fitting portion 73.

Since the valve housing 70 is used under a thermally severe environment, the valve housing 70 is integrally formed of a heat resisting material, for example, a stainless steel or the like which withstands high temperatures. Further, the nozzle 72 is also formed as a cylindrical shape of a heat resisting material, for example, stainless steel or the like which withstands high temperatures in the same manner as the valve housing 70. Further, the metal bearing 74 is formed as a cylindrical shape, for example, of Ni—Cu—C. Further, a recessed gear case 76 is integrally formed in an outer portion of the nozzle fitting portion 73 and the shaft bearing portion 75, and the recessed gear case 76 rotatably accommodates the power transmission mechanism in the power unit.

Further, a recessed motor housing 77 accommodating the drive motor 5 in the power unit is integrally formed in an outer wall portion of the nozzle fitting portion 73 and the shaft bearing portion 75 in a lower side of the drawing. Further, a heat insulating layer 78 generated by air for preventing the heat of the EGR gas from being transmitted to an ambient atmosphere within the motor housing 77 is provided between the nozzle fitting portion 73 and the shaft bearing portion 75, and the motor housing 77, for example, in the nozzle fitting portion 73 around the exhaust gas reflow path 71, near the valve full-close position or around the nozzle 72.

Further, a coolant piping is provided for drawing flow of engine coolant (hot water) within a predetermined temperature range (for example, 75 to 80° C.) in a hot water circulation path formed in the nozzle fitting portion 73, for example, around the exhaust gas reflow path 71, near the valve full-close position or around the nozzle 72, and a coolant piping is provided for discharging the hot water out of the hot water circulation path. These coolant pipings are connected to the valve housing 70. The engine coolant (the hot water) may be circulated and fed to the heat insulating layer 78.

Further, the sensor cover 83 closing the opening side of the gear case 76 is attached to the opening side of the gear case 76 and the motor housing 77 of the valve housing 70. The sensor cover 83 is made of a thermoplastic resin electrically insulating between the terminals of the valve opening degree sensor 7 mentioned above. Further, the sensor cover 83 has a fitted portion (a bonded end surface) fitted to a fitting portion (a bonding end surface) provided in the opening side of the gear case 76 and the motor housing 77, and is assembled in an airtight manner in the fitting portion provided in the opening side of the gear case 76 by a rivet, a screw or the like.

The EGR valve 30 is constituted by a butterfly-shaped rotary valve formed as an substantially disc shape of a heat resisting material, for example, stainless steel or the like, which withstands high temperatures, in the same manner as the nozzle 72, so as to control an EGR amount of the EGR gas mixed into intake air flowing within the intake pipe. The EGR valve 30 is fastened and fixed to a valve installation portion 86 formed in the valve shaft 80 by using a plurality of screws 87 such as fastening screws, fixing bolts or the like. In an outer peripheral portion of the EGR valve 30, there is formed an annular retention groove retaining a seal ring (a seal member) 88 which can be brought into slidable contact with an inner wall surface (a flow path wall surface) of the nozzle 72 near the valve full-close position. The seal ring 88 is formed annular by the heat resisting material, for example, the stainless steel or the like which withstands high temperatures, in the same manner as the EGR valve 30.

The valve shaft 80 mentioned above has the valve installation portion 86 integrally formed of the heat resisting material, for example, the stainless steel or the like which withstands high temperatures, in the same manner as the EGR valve 30, so as to retain the EGR valve 30. The valve shaft 80 has a semicircular shape, and is rotatably or slidably supported by the shaft bearing portion 75. Further, in an end portion of the valve shaft 80, there is integrally formed a swaging portion for fixing a valve side gear 90, which is one of the constituting elements of the power transmission mechanism, and the rotor 81, which is one of the constituting elements of the valve opening degree sensor 7 by fixing means such as swaging. An annular stopper 92 for retaining an oil seal 91 is installed between a right end portion in FIG. 2 of the valve shaft 80 and an inner peripheral portion of the bearing portion 75.

The power unit of the present embodiment includes the drive motor 5 driving the valve shaft 80 in a rotating direction, and a power transmission mechanism (a gear reduction mechanism in the present embodiment) for transmitting the rotational power of the drive motor 5 to the valve shaft 80. The drive motor 5 is connected to a motor energizing terminal embedded in the gear case 76 and the sensor cover 83 and serves as a driving source actuated through energization. The drive motor 5 is a driving source having a front frame 93 made of a metal material, a cylindrical yoke 94, a plurality of permanent magnets, a motor shaft, an armature core, and an armature coil.

Further, the drive motor 5 is a motor actuator (a direct current electric motor) energized through two motor energizing terminals embedded and retained in the sensor cover 83, two motor connection terminals integrally connected to the motor energizing terminals and protruding to the drive motor 5 side from the sensor cover 83, and two motor feed terminals detachably connected to the motor connection terminals, whereby the motor shaft is rotated.

Further, in the present embodiment, a drive current value to the drive motor 5 is feedback controlled in such a manner that a command EGR amount (a target valve opening degree) commanded by the ECU 20 is substantially equal to a detection EGR amount (a valve opening degree) detected by the valve opening degree sensor 7. It is desirable that the control of the control command value (the drive current value) to the drive motor 5 is carried out on the basis of a duty (DUTY) control. In other words, there is employed the duty (DUTY) control varying the valve opening degree by adjusting a rate (an energizing rate, a duty ratio) of ON/OFF of a control pulse signal per unit time in correspondence to a deviation between the command EGR amount (the command value opening degree) and the detection EGR amount (the valve opening degree).

The front frame 93 is fastened and fixed to an opening end surface of the motor housing 77 by using the screw such as the fixing bolt, the fastening screw or the like. Further, a front end portion of the yoke 94 is fixed to the front frame 93 at a plurality of positions by using the fixing means such as the caulking or the like. A wave washer 95 generating an energizing force energizing the drive motor 5 in a rightward direction in FIG. 2 (an energizing force pressing to the front frame 93) is interposed between a projecting end yoke of the yoke 94 of the drive motor 5 of the present embodiment and a recessed bottom wall portion of the motor housing 77. The wave washer 95 is an annular elastic body which can be elastically deformed substantially in the same direction as an axial direction of the motor shaft, and is formed as a waveform in a circumferential direction.

The gear reduction mechanism is valve driving means which decelerates the rotation speed of the motor shaft of the drive motor 5 so as to have a predetermined reduction gear ratio, has a pinion gear 96 fixed to an outer periphery of the motor shaft of the drive motor 5, an intermediate reduction gear 97 engaging with the pinion gear 96 so as to rotate, and the valve side gear 90 engaging with the intermediate reduction gear 97 so as to rotate, and rotationally drives the valve shaft 80. The pinion gear 96 is a motor side gear which is integrally formed as a predetermined shape of a metal material, and integrally rotates with the motor shaft of the drive motor 5.

The intermediate reduction gear 97 is integrally formed as a predetermined shape of a resin material, and is rotatably fitted to an outer periphery of a support shaft 98 forming a center of rotation. Further, the intermediate reduction gear 97 is provided with a large-diameter gear 99 engaging with the pinion gear 96, and a small-diameter gear 100 engaging with the valve side gear 90. The pinion gear 96 and the intermediate reduction gear 97 correspond to torque transmitting means transmitting the torque of the drive motor 5 to the valve side gear 90. Further, one end portion (a right end portion in FIG. 2) in an axial direction of the support shaft 98 is fitted to a recess formed in an inner wall surface of the sensor cover 83, and the other end portion (a left end portion in FIG. 2) thereof is press fitted and fixed to a recess formed in a bottom wall surface of the gear case 76.

The valve side gear 90 of the present embodiment is integrally formed as a predetermined substantially annular shape of a resin material, and a gear portion 101 engaging with a small-diameter gear 100 of the intermediate reduction gear 97 is integrally formed in an outer circumferential surface of the valve side gear 90. In the exhaust gas recirculation system in accordance with the present embodiment, a return spring 102 is installed between a bottom wall surface of the gear case 76 and a left end surface in FIG. 2 of the valve side gear 90. The rotor 81 made of the iron metal material (the magnetic material) is insert molded in an inner diameter side of the valve side gear 90.

Next, a description will be given of an operation of the exhaust gas recirculation system in accordance with the present embodiment. When the engine 1 is started, whereby the intake valve 4a of the engine 1 is opened, the intake air filtrated by the air cleaner 6 is distributed in the intake manifold of each of the cylinders #1 to #4 through the intake passage 4, and is drawn into each of the cylinders #1 to #4 of the engine 1. Further, in the engine 1, the combustion is achieved by compressing the air until the temperature becomes higher than the temperature at which the fuel is burned, and spraying the fuel thereto from the injector 32. Further, the combustion gas burned within each of the cylinders #1 to #4 is discharged from the exhaust port via the exhaust manifold and the exhaust passage 24. At this time, if the drive motor 5 is energized by the ECU 20 such that the EGR valve 30 comes to a predetermined opening degree, the motor shaft of the drive motor 5 is rotated.

The pinion gear 96 is rotated on the basis of the rotation of the motor shaft, and the torque is transmitted to the large-diameter gear 99 of the intermediate reduction gear 97. Further, when the small-diameter gear 100 is rotated around the support shaft 98 in accordance with the rotation of the large-diameter gear 99, the valve side gear 90 having the gear portion 101 engaging with the small-diameter gear 100 is rotated. Accordingly, since the valve side gear 90 is rotated around the valve shaft 80, the valve shaft 80 is rotated at a predetermined rotation angle, and is rotationally driven in a direction (an opening direction) in which the EGR valve 30 is open to the full-open position from the valve full-close position. Accordingly, a part of the exhaust gas of the engine 1 flows as an EGR gas into the valve housing 70 and the exhaust gas reflow path 71 of the nozzle 72 via the EGR passage 26. Further, the EGR gas flowing into the exhaust gas reflow path 71 flows into the intake passage 4, and is mixed with the intake air from the air cleaner 6.

The reflow rate of the EGR gas is feedback controlled in such a manner as to retain a predetermined value by the detection signals from the intake air amount sensor (the air flow meter) 8, the intake air temperature sensor 10 and the valve opening degree sensor 7. Accordingly, the valve opening degree of the EGR valve 30 is linearly controlled in such a manner that the intake air drawn into each of the cylinders #1 to #4 of the engine 1 comes to the EGR amount set for each operating state of the engine 1, for lowering the emission, and the intake air is mixed with the EGR gas reflowing from the exhaust passage 24 to the intake passage 4 via the exhaust gas reflow path 71.

—EGR Valve Control Operation—

Figure 4:
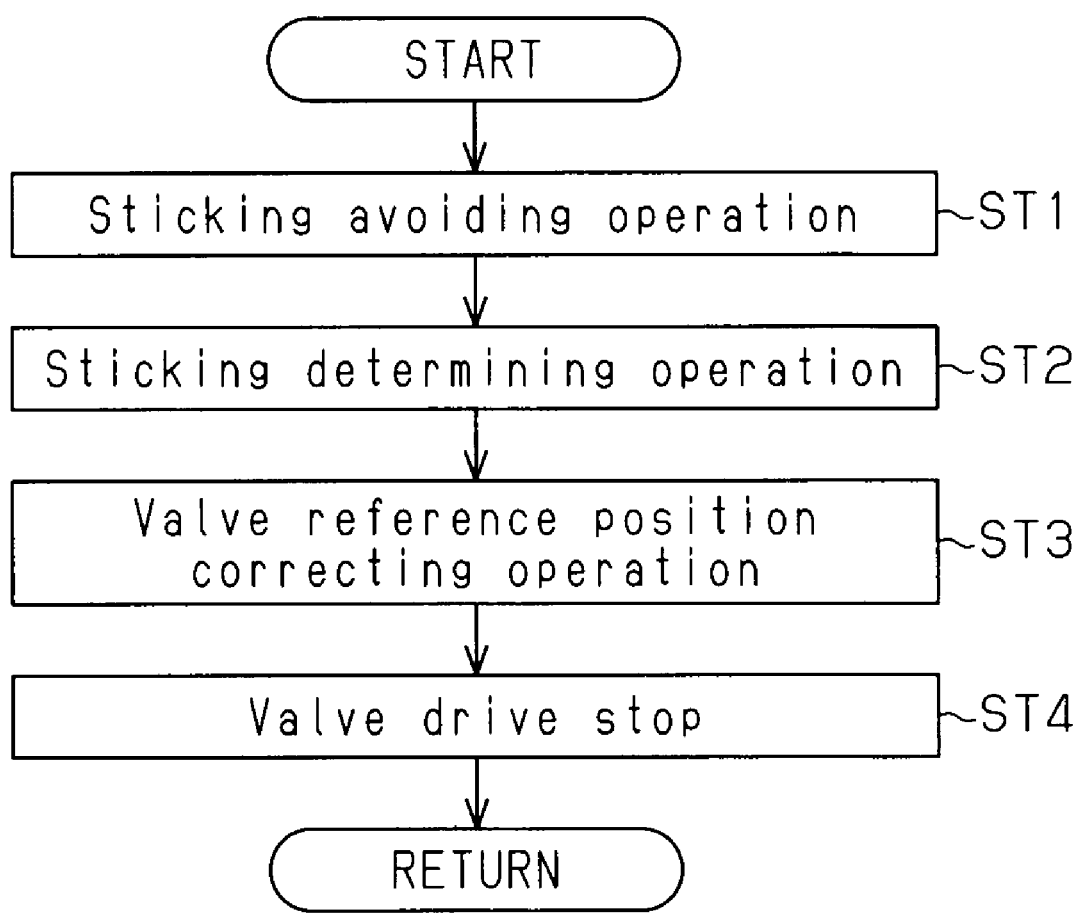
FIG. 4 is a flowchart for explaining a control procedure of a whole of a control operation of the EGR valve.

Next, a description will be given of a control operation, which is a characteristic feature of the present embodiment. Before describing various types of control operations, a description will be given of the outline of the entire control procedure with reference to FIG. 4.

Taking into consideration a possibility that the EGR valve 30 is stuck to the inner circumferential surface of the exhaust gas reflow path 71 by the deposit, which is sediment of the combustion product contained in the EGR gas, "sticking avoiding operation" for removing the deposit is executed at a time when "sticking avoiding operation execution condition" mentioned below is established (step ST1). The "sticking avoiding operation" is executed during the stop of the engine 1. When the opening and closing motion of the EGR valve 30 is carried out as the "sticking avoiding operation" during the operation of the engine 1, the amount of the EGR gas is deviated from a proper value, and there is a possibility that a problem such as deterioration of the emission is caused. However, in the present embodiment, the problem can be avoided by executing the "sticking avoiding operation" during the stop of the engine 1.

Further, in conjunction with the execution of the "sticking avoiding operation", there is carried out the "sticking determining operation" determining whether the sticking of the EGR valve 30 is dissolved (step ST2). After these operations, only when it is determined that the sticking of the EGR valve 30 is dissolved by the "sticking determining operation", there is executed a correcting (learning) operation (a valve reference position correcting operation) fixing the EGR valve 30 to a predetermined reference position and setting the position to a valve reference position at a time of carrying out the opening and closing control operation of the EGR valve 30 at a time of operating the engine (step ST3). Thereafter, the opening control of the EGR valve 30 is stopped, and a normal engine stopped state (step ST4) is started. A description will be given below of each of the control operations.

—Sticking Avoiding Operation—

The EGR valve control apparatus in accordance with the present embodiment executes the "sticking avoiding operation" for removing the deposit, while taking into consideration a possibility that the EGR valve 30 is stuck to the inner circumferential surface of the exhaust gas reflow path 71 by the deposit, which is sediment of the combustion product contained in the EGR gas. This "sticking avoiding operation" is performed to drive the drive motor 5 mentioned above at a time when a predetermined "sticking avoiding operation execution condition" is established, and open and close the EGR valve 30 in a predetermined angular range near the full-close position. The angular range comes to a range of 30 degrees (a position shown by X in FIG. 3) close to a positive side (a side toward the EGR valve full-open position) from the full-close position of the EGR valve 30 and 30 degrees (a position shown by Y in FIG. 3) close to a negative side (an opposite side to the side toward the EGR valve full-open position) from the full-close position. The stuck deposit is scraped off by the EGR valve 30 by alternately carrying out (for example, five to-and-fro motions of) the opening motion of the EGR valve 30 to the positive side and the opening motion of the EGR valve 30 to the negative side, whereby it is possible to dissolve or prevent the EGR valve 30 from being stuck. The angular range mentioned above is not limited to this, but may be set optionally. Further, the angle in the positive side and the angle in the negative side may be different from each other. Further, the opening direction at the first time at a time of starting the sticking avoiding operation may be set to the positive side or the negative side.

Next, a description will be given of the "sticking avoiding operation execution condition" mentioned above. The "sticking avoiding operation execution condition" is established when the IG switch 48 is turned off in accordance with the OFF operation of the ignition key from the state in which the engine 1 is running. In other words, when the IG switch 48 is turned off, the "sticking avoiding operation" is executed under condition that the engine 1 has been running and stopped immediately before the IG switch 48 is turned off. In other words, when the ignition OFF operation is carried out without starting the operation of the engine 1 after the ignition ON operation is carried out, the "sticking avoiding operation" is not executed.

Figure 5:
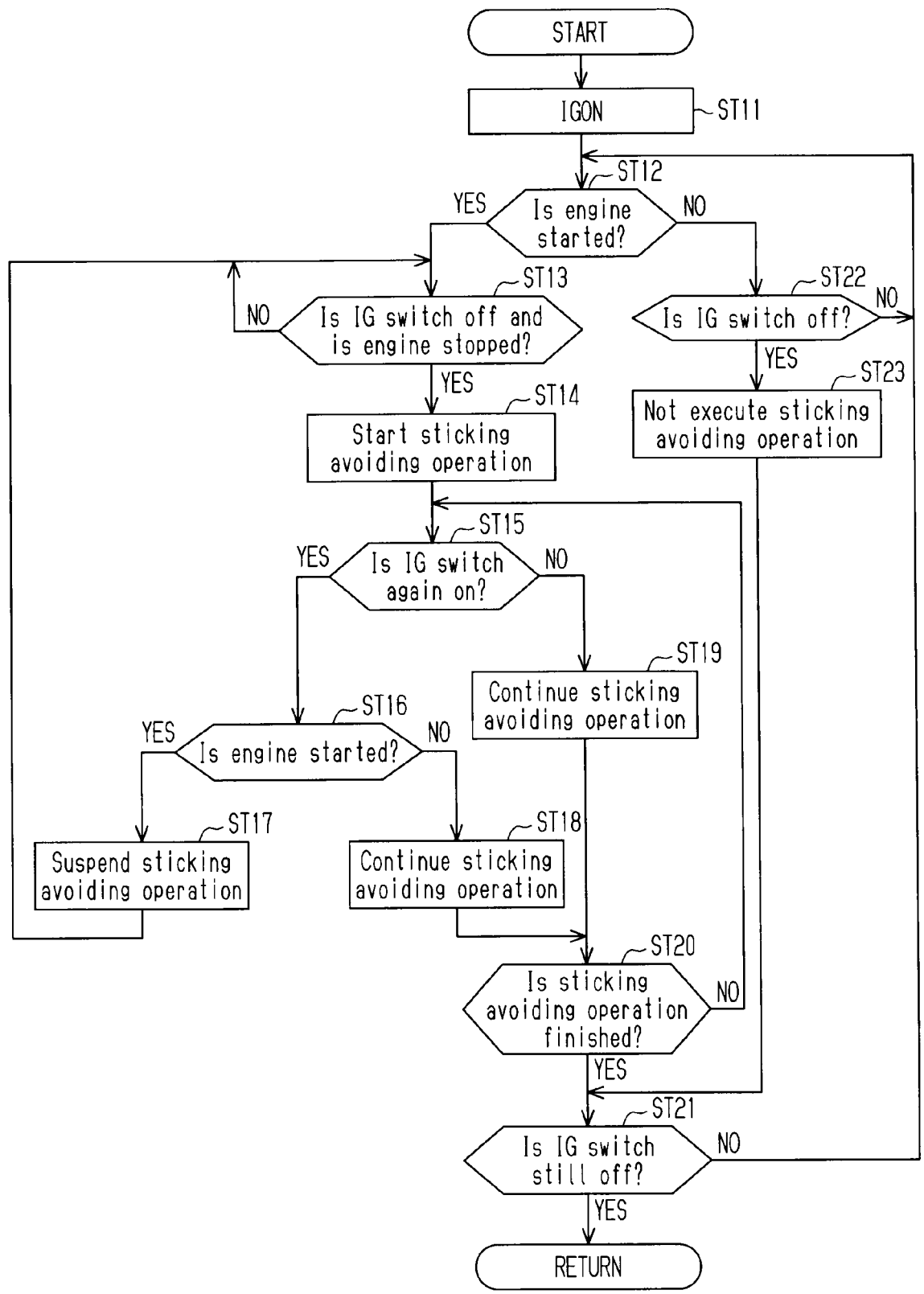
FIG. 5 is a flowchart for explaining a control procedure of an execution and a non-execution of the sticking avoiding operation.

A description will be given below of control procedures for executing and not executing the "sticking avoiding operation" executed by the ECU 20 mentioned above in accordance with a flowchart in FIG. 5.

First, when the ON signal from the IG switch 48 in accordance with the ON operation of the ignition key is received in step ST11, the process goes to step ST12, and it is determined whether the engine 1 is started (the ignition key is operated to the start position, whereby the starter is started). This is determined by receiving the output from the rotation speed sensor 44. Further, it may be determined on the basis of the ON/OFF information of the starter switch 50 mentioned above.

When the engine 1 is started and YES is determined in step ST12, the process goes to step ST13, and it is determined whether the ignition key is turned off (the IG switch 48 is turned off) after starting the engine 1, whereby the engine 1 is stopped.

In other words, it is determined whether the engine 1 under operation is stopped by the ignition key operation of the driver. Further, when YES is determined in step ST13, it is determined that there is a possibility that the deposit has collected in the inner surface of the exhaust gas reflow path 71 during the operation of the engine 1, and the process goes to step ST14 so as to start the "sticking avoiding operation". In other words, the EGR valve 30 is opened and closed in the predetermined angular range near the full-close position. In the present embodiment, it is determined that the "sticking avoiding operation" is finished when the opening and closing motion of the EGR valve 30 is carried out five times consecutively (finishing number of times in the present invention). If the opening and closing motion is carried out five times consecutively, the drive motor 5 is stopped so as to finish the "sticking avoiding operation".

After the "sticking avoiding operation" is started in step ST14 mentioned above, the process goes to step ST15, and it is determined whether the OFF operated ignition key is again turned on (the IG switch 48 is again turned on). When the ignition key is again turned on and YES is determined, the process goes to step ST16, and determined whether the engine 1 is started (the ignition key is operated to the start position, whereby the engine 1 is started). Further, when the engine 1 is started, whereby YES is determined, the process goes to step ST17, and the sticking avoiding operation mentioned above is suspended. In other words, the series of the steps ST14 to ST17 is an operation in which the sticking avoiding operation is suspended such that the opening degree of the EGR valve 30 is set to correspond to the operating state of the engine 1, when the starting operation of the engine 1 is carried out in the middle of the sticking avoiding operation (during the period before the sticking avoiding operation is finished). Further, after suspending the sticking avoiding operation in step ST17 as mentioned above, the process goes back to step ST13 mentioned above. In other words, when the ignition key is again turned off, whereby the engine 1 is stopped, the "sticking avoiding operation" is restarted in step ST14. The restart of the "sticking avoiding operation" in this case is executed in such a manner that the opening and closing motion of the EGR valve 30 is carried out five times (under a state in which the previous number of times of the execution is cleared) regardless of the number of times of the to-and-fro motions of the EGR valve 30 in the last suspended "sticking avoiding operation". The operations after step ST15 are carried out in the same manner as the case mentioned above.

On the other hand, when the engine 1 is not started and NO is determined in step ST16, the process goes to step ST18, and the "sticking avoiding operation" mentioned above is continued. Further, in step ST20, it is determined whether the "sticking avoiding operation" has been finished, that is, whether the opening and closing motion of the EGR valve 30 has been executed five times consecutively, and if the "sticking avoiding operation" has not been finished, the process goes back to step ST15. In other words, when the engine 1 is started (YES is determined in step ST16) during the period before the "sticking avoiding operation" is finished, the "sticking avoiding operation" is suspended (step ST17). On the other hand, when the "sticking avoiding operation" is finished and YES is determined in step ST20 mentioned above, the process goes to step ST21, and it is determined whether the state in which the IG switch 48 is in the OFF state is continued for a predetermined time (for example 3 sec), and the present control is finished after the predetermined time has passed.

Further, in the case where the ignition key is maintained in the OFF state and NO is determined in step ST15 mentioned above, the process goes to step ST19. In this case, the "sticking avoiding operation" is continued, and the process goes to step ST20. Further, when the continued "sticking avoiding operation" reaches the end (YES is determined in step ST20), the process goes to step ST21, and it is determined whether the state in which the IG switch 48 is in the OFF state is continued for a predetermined time, and the present control is finished after the predetermined time has passed.

On the other hand, in the case where the engine 1 is not started and NO is determined in step ST12 mentioned above, the process goes to step ST22, and it is determined whether the ignition key is turned off (the IG switch 48 is turned off). In other words, it is determined whether the ignition key is turned off without starting the engine 1 after the ignition key is turned on.

Further, when YES is determined in step ST22, it is determined that the ignition key is turned off, however the engine 1 is not operated immediately before the ignition key is turned off, and the deposit has not collected on the inner surface of the exhaust gas reflow path 71, and the process goes to step ST21 without going to step ST23 to execute the "sticking avoiding operation". Accordingly, it is possible to prevent the "sticking avoiding operation" from being uselessly executed in spite of the fact that the deposit has not collected on the inner surface of the exhaust gas reflow path 71. Further, when NO is determined in step ST22 mentioned above, the process goes back to step ST12. When the engine 1 is started, the process goes to step ST13. Further, when the engine 1 is not started, the operations of the steps ST12 and ST22 are repeated until the ignition key is turned off.

Figure 6:
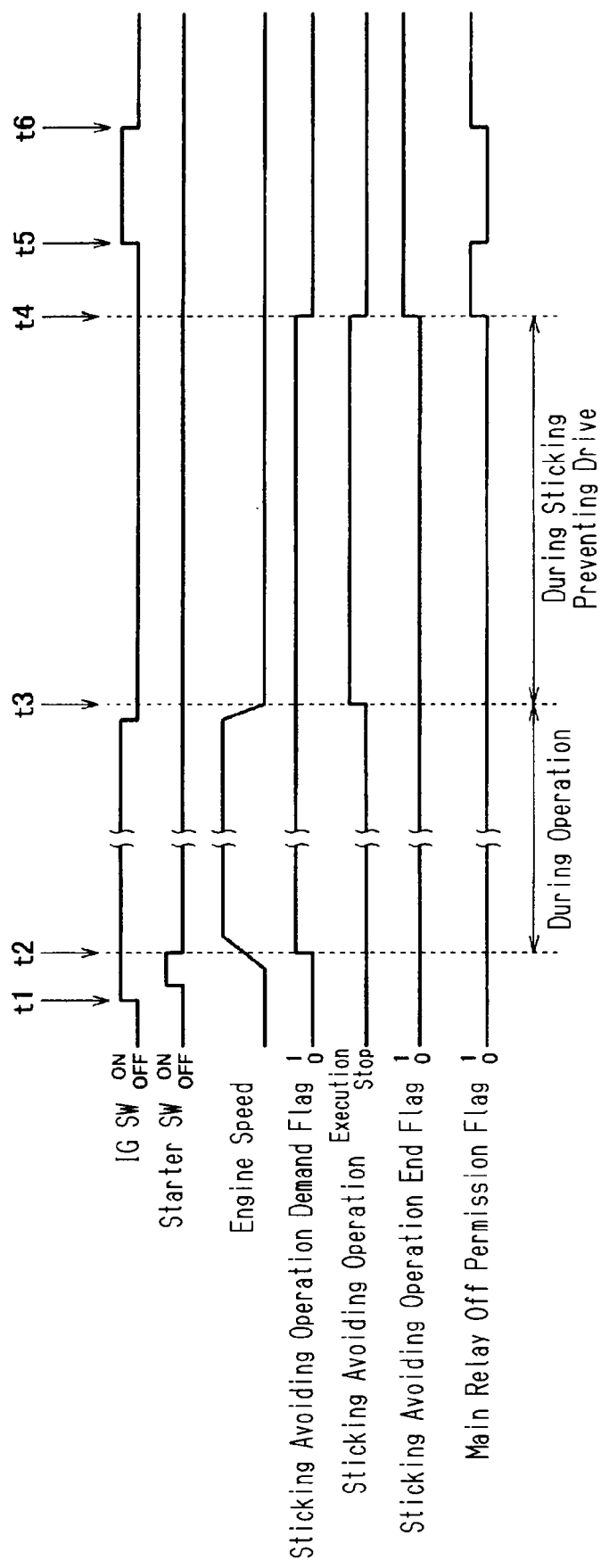
FIG. 6 is a timing chart showing changes of an IG switch, a starter switch, an engine speed, a sticking avoiding operation demand flag, execution or non-execution of the sticking avoiding operation, a sticking avoiding operation end flag, and a main relay OFF permission flag in a first pattern of the sticking avoiding operation.
Figure 7:
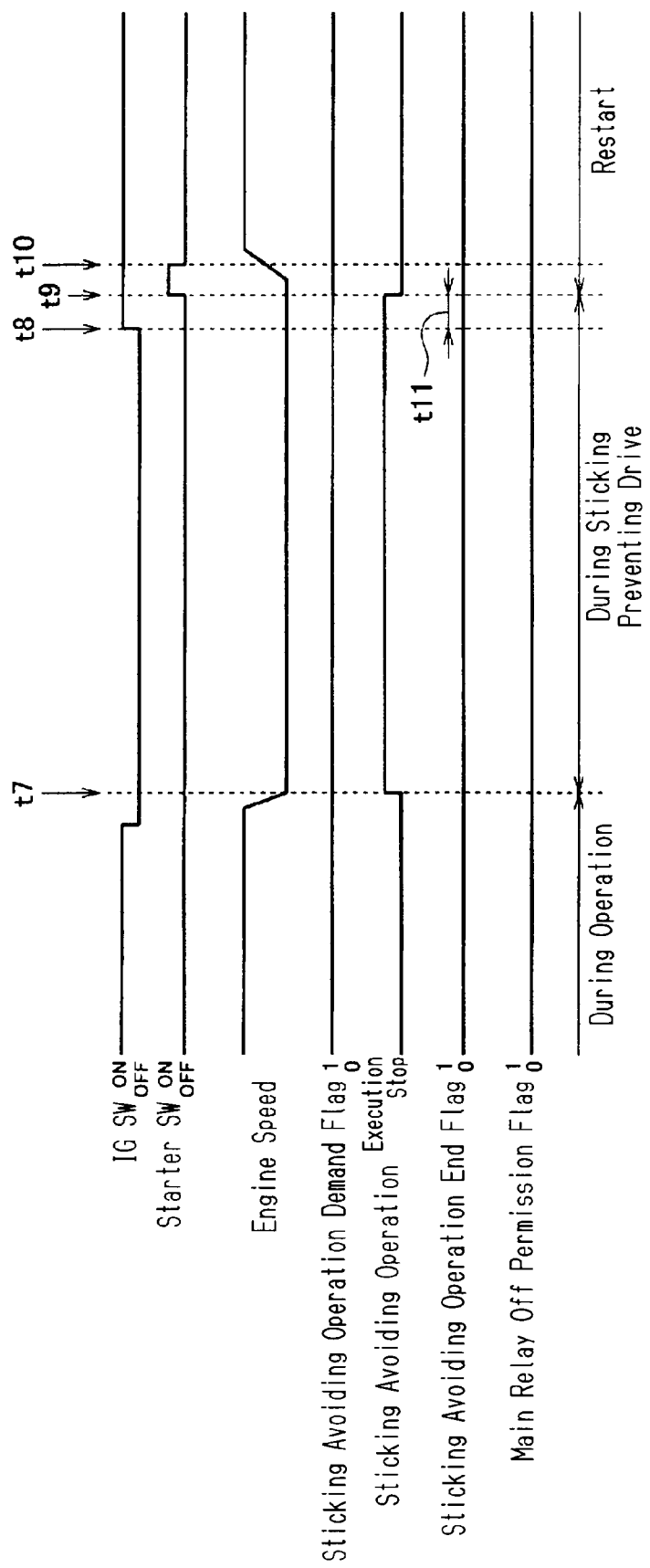
FIG. 7 is a timing chart showing changes of the IG switch, the starter switch, the engine speed, the sticking avoiding operation demand flag, execution or non-execution of the sticking avoiding operation, the sticking avoiding operation end flag, and the main relay OFF permission flag in a second pattern of the sticking avoiding operation.
Figure 8:
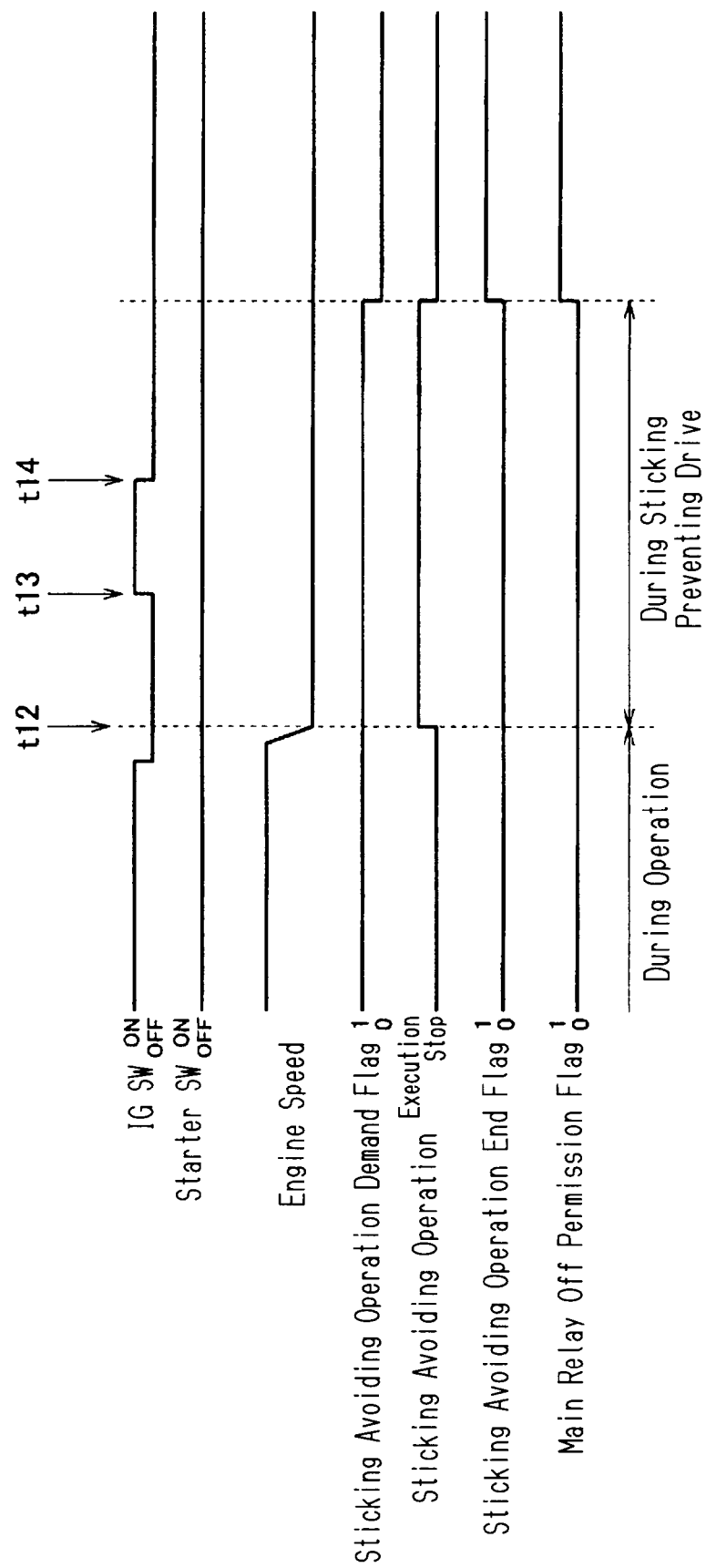
FIG. 8 is a timing chart showing changes of the IG switch, the starter switch, the engine speed, the sticking avoiding operation demand flag, execution or non-execution of the sticking avoiding operation, the sticking avoiding operation end flag, and the main relay OFF permission flag in a third pattern of the sticking avoiding operation.

Next, a description will be given of specific examples (three patterns) of the execution and the non-execution of the sticking avoiding operation mentioned above along a timing chart in FIGS. 6 to 8. FIGS. 6 to 8 show respective temporal changes of the IG switch 48, the starter switch 50, the engine speed, the sticking avoiding operation demand flag, execution or non-execution of the sticking avoiding operation, the sticking avoiding operation end flag, and the main relay OFF permission flag. The sticking avoiding operation demand flag comes to "1 (ON)" at the same time of starting the engine 1, and comes to "0 (OFF)" when the "sticking avoiding operation" is finished. Further, the sticking avoiding operation end flag comes to "1 (ON)" if the "sticking avoiding operation" is started and the "sticking avoiding operation" is finished. Further, the main relay OFF permission flag is provided for inhibiting the main relay from being turned off for a predetermined time so that the "sticking avoiding operation" is permitted to be executed even if the IG switch 48 is turned off. The main relay OFF permission flag comes to "1 (ON)" when the IG switch 48 is turned off and the "sticking avoiding operation" is finished.

(First Pattern)

First, a description will be given of an operation when the "sticking avoiding operation" is finished without the start of the engine 1 after the engine 1 is stopped by turning the IG switch 48 turned off during the engine operation, along a timing chart in FIG. 6.

If the IG switch 48 is turned on (time t1 in the drawing) in accordance with the ON operation of the ignition key from the stopped state of the engine 1, the ignition key is thereafter operated to the start position, and the starter is started (the starter switch 50 is turned on), the cranking of the engine 1 is started, and the engine 1 is thereafter started (time t2 in the drawing). The sticking avoiding operation demand flag comes to "1" in accordance with the start of the engine 1.

If the operation of the engine 1 is continued, the driver turns off the ignition key, and the IG switch 48 is turned off in accordance therewith, the engine 1 is stopped (time t3 in the drawing). Further, the "sticking avoiding operation" is started in accordance with the stop of the engine 1. In other words, since the IG switch 48 is turned off from the operating state of the engine 1 and the engine 1 is stopped, whereby the "sticking avoiding operation execution condition" mentioned above is established, the "sticking avoiding operation" is started.

Further, when the opening and closing motion of the EGR valve 30 is consecutively executed five times without the restart of the engine 1, the "sticking avoiding operation" is finished (time t4 in the drawing), the sticking avoiding operation demand flag comes to "0" at the same time of this finish, the sticking avoiding operation end flag comes to "1", and the main relay OFF permission flag further comes to "1". In other words, the main relay of the engine control system is turned off at the same time of the end of the "sticking avoiding operation".

As mentioned above, when the ignition key is turned off and the IG switch 48 is turned off (time t6 in the drawing) without the ignition key being operated to the start position, that is, without the starter being started (without the starter switch 50 being turned on), when the ignition key is turned on and the IG switch 48 is turned on (time t5 in the drawing) after the "sticking avoiding operation" is finished, the "sticking avoiding operation execution condition" is not established. Accordingly, the "sticking avoiding operation" is not started. In other words, even if the IG switch 48 is turned off, the engine 1 is not operated immediately before the IG switch 48 is turned off. Thus, it is determined that the deposit has not collected on the inner surface of the exhaust gas reflow path 71, and the "sticking avoiding operation" is not executed.

(Second Pattern)

Next, a description will be given of an operation in the case where the engine 1 is restarted during the execution of the sticking avoiding operation, along a timing chart in FIG. 7.

If the driver turns off the ignition key from the state in which the engine 1 is running, and the IG switch 48 is turned off in accordance therewith, the engine 1 is also stopped (time t7 in the drawing). Then, the "sticking avoiding operation" is started in accordance with the stop of the engine 1. In other words, since the IG switch 48 is turned off from the operating state of the engine 1 and the engine 1 is stopped, whereby the "sticking avoiding operation execution condition" is established, the "sticking avoiding operation" is started.

Further, if the IG switch 48 is turned on (time t8 in the drawing) in accordance with the ON operation of the ignition key before the sticking avoiding operation is finished, and the ignition key is operated to the start position (time t9 in the drawing), the starter is started (the starter switch 50 is turned on), whereby the engine 1 is started (time t10 in the drawing) after the cranking of the engine 1 is carried out. The "sticking avoiding operation" is not suspended only by the ON operation of the IG switch 48, but is continued as it is (a period t11 in the drawing). Accordingly, when the consecutive five times of opening and closing motions of the EGR valve 30 are finished during this period, the "sticking avoiding operation" is assumed to be finished, the sticking avoiding operation demand flag comes to "0" at the same time of this end, the sticking avoiding operation end flag comes to "1", and the main relay OFF permission flag further comes to "1". In the structure shown in FIG. 7, the "sticking avoiding operation" is not finished during the period mentioned above, and there is maintained a state in which the sticking avoiding operation demand flag is "1", the sticking avoiding operation end flag is "0", and the main relay Off permission flag is "0".

(Third Pattern)

Next, a description will be given of an operation in the case where the IG switch 48 is turned on during the execution of the sticking avoiding operation, and the IG switch 48 is turned off without the engine 1 being restarted, along a timing chart in FIG. 8.

If the driver turns off the ignition key from the state in which the engine 1 is running, and the IG switch 48 is turned off in accordance therewith, the engine 1 is also stopped (time t12 in the drawing). Then, the "sticking avoiding operation" is started in accordance with the stop of the engine 1. In other words, since the IG switch 48 is turned off from the operating state of the engine 1 and the engine 1 is stopped, whereby the "sticking avoiding operation execution condition" is established, the "sticking avoiding operation" is started.

Further, when the IG switch 48 is turned on (time t13 in the drawing) in accordance with the ON operation of the ignition key before the sticking avoiding operation is finished, and the IG switch 48 is thereafter turned off (time t14 in the drawing) in accordance with the OFF operation of the ignition key without the starter being started (the starter switch 50 being turned on), the "sticking avoiding operation execution condition" mentioned above is not established. Accordingly, the "sticking avoiding operation" started at the time t11 is continued. The operation after the "sticking avoiding operation" is finished is the same as the case shown in FIG. 6 mentioned above.

—Sticking Determining Operation—

The ECU 20 mentioned above is structured such that the "sticking determining operation" determining whether the sticking of the EGR valve 30 is dissolved by the "sticking avoiding operation" at a time of executing the "sticking avoiding operation" mentioned above. The "sticking determining operation" is performed to determine that the sticking of the EGR valve 30 is dissolved when the valve moving amount reaches a predetermined sticking dissolving moving amount (a position 30 degrees from the full-close position mentioned above) within the predetermined movement control period at a time of moving the EGR valve 30 in one direction (for example, to the positive side).

—Valve Reference Position Correcting Operation—

Further, when it is determined that the sticking of the EGR valve 30 is dissolved on the basis of the "sticking determining operation" mentioned above, "valve reference position correcting operation" is carried out. The "valve reference position correcting operation" is not executed when it is determined that the sticking of the EGR valve 30 is not dissolved by the "sticking avoiding operation". Further, in this case, the opening degree control of the EGR valve 30 is not executed (the valve opening and closing motion is inhibited) even if the operation of the engine 1 is thereafter started. Accordingly, it is possible to inhibit such an operation as to correct the valve reference position in the state in which the EGR valve 30 is stuck. It is thus possible to avoid an erroneous recognition of the valve reference position, preventing breakage of the EGR valve 30 from being caused by forcibly actuating the stuck EGR valve 30.

The "valve reference position correcting operation" mentioned above includes the following two operations. In other words, the "valve reference position correcting operation" is performed to carry out the reference position correction in such a manner as to position the EGR valve 30 at a predetermined position (a previously set reference position), recognize the position by the valve opening degree sensor 7 mentioned above and set the position to a reference position at a time of carrying out the valve opening and closing motion, and the valve opening and closing control operation is carried out on the basis of the recognized reference position at a time of thereafter operating the engine. Further, the predetermined position for positioning the EGR valve 30 at this time includes the following positions.

First, the reference position mentioned above is set to the full-close position (the position having the opening degree 0) of the EGR valve 30. For example, two kinds of return springs 102 are provided for applying the urging force in the positive direction and the urging force in the negative direction, and a balanced position of the energizing forces of these return springs 102 comes to the full-close position of the EGR valve 30 when the current application to the drive motor 5 is canceled.

Another positioning involves providing a stopper regulating the moving amount of the EGR valve 30 to the negative side, and causing the EGR valve 30 to contact this stopper by energizing the drive motor 5, so that this position is set to the reference position mentioned above. For example, the stopper is provided at the position 30 degrees in the negative side of the EGR valve 30, and the position detected by the valve opening degree sensor 7 in the state in which the EGR valve 30 is brought into contact with the stopper is set to the reference position 30 degree in the negative side.

As described above, in the present embodiment, the start condition of the "sticking avoiding operation", in which the EGR valve 30 is caused to move to and fro to avoid the sticking of the EGR valve 30, is set to the ignition OFF operation time immediately after the engine has been stopped. Accordingly, it is possible to avoid useless executions of "sticking avoiding operation" and it is possible to prevent the electric power from being wasted. Further, it is possible to dissolve the uncomfortable feeling of the passenger caused by the frequently generated operating sound of the "sticking avoiding operation". Further, since the "sticking avoiding operation" is executed under the condition that the temperature of the internal combustion engine is high, it is possible to easily carry out the opening and closing motion of the EGR valve 30 at the same time of starting the "sticking avoiding operation". Also, it is possible to effectively scrape off the deposit by the EGR valve 30, and it is possible to reduce the load of the electric motor 5 so as to achieve a long service life of the electric motor 5.

Other Embodiments

In the embodiment mentioned above, the description is given of the case that the present invention is applied as the control apparatus of the EGR valve 30 in the common rail type cylinder direct-injection multiple cylinder diesel engine 1 mounted on an automobile. The present invention is not limited to this, but may be applied to other types of diesel engines or gasoline engines. Further, the present invention is not limited to the engine for automobile, but may be applied to engines used for other uses. Further, the number of the cylinders and the engine type (an in-line type engine, a V-type engine) are not particularly limited.

Further, the valve control apparatus according to the present invention is not limited to the structure applied to the EGR valve 30, but may be applied to the throttle valve 14. In other words, the objective of the present invention is to avoid sticking of the throttle valve 14 by deposit, and to carry out the valve reference position correcting operation in the state in which the sticking is not generated.

The invention claimed is:

1. A valve control apparatus of an internal combustion engine, the apparatus comprising:
 a valve provided in a gas passage of the engine that varies a flow rate of gas that flows through the gas passage by carrying out an opening and closing motion; and
 a valve actuation unit that executes a sticking avoiding operation that dissolves or that prevents sticking of the valve by causing the valve to move to and fro so as to open and close the valve by predetermined moving amounts respectively in one direction and the other direction near a full-close position of the valve,
 wherein the apparatus inhibits the sticking avoiding operation by the valve actuation unit from being initiated when an ignition OFF operation is carried out following an ignition ON operation being carried out and operation of the engine was not initiated between the ignition ON operation being carried out and the ignition OFF operation being carried out.

2. The valve control apparatus according to claim 1, wherein, even if the ignition ON operation is carried out during the execution of the sticking avoiding operation, the apparatus continues the sticking avoiding operation by the valve actuation unit until the operation of the engine is started.

3. The valve control apparatus according to claim 1, wherein the ignition ON operation is carried out by turning on an ignition switch, the operation of the engine in started by turning on a starter switch, and the ignition OFF operation is carried out by turning off the ignition switch.

4. A valve control apparatus of an internal combustion engine, the apparatus comprising:
 a valve provided in a gas passage of the engine that varies a flow rate of gas that flows through the gas passage by carrying out an opening and closing motion; and
 a valve actuation unit that executes a sticking avoiding operation that dissolves or that prevents sticking of the valve by causing the valve to move to and fro so as to open and close the valve by predetermined moving amounts respectively in one direction and the other direction near a full-close position of the valve,
 wherein the apparatus executes the sticking avoiding operation by the valve actuation unit in conjunction with an ignition OFF operation only when the sticking avoiding operation has not yet been executed after an operation of the engine is finished.

5. The valve control apparatus according claim 4, wherein, even if an ignition ON operation is carried out during the execution of the sticking avoiding operation, the apparatus continues the sticking avoiding operation by the valve actuation unit until the operation of the engine is started.

6. The valve control apparatus according to claim 4, wherein an ignition ON operation is carried out by turning on an ignition switch, the operation of the engine in started by turning on a starter switch, and the ignition OFF operation is carried out by turning off the ignition switch.

7. A valve control apparatus of an internal combustion engine, the apparatus comprising:
 a valve provided in a gas passage of the engine that varies a flow rate of gas that flows through the gas passage by carrying out an opening and closing motion; and
 a valve actuation unit that executes a sticking avoiding operation that dissolves or that prevents sticking of the valve by causing the valve to move to and fro so as to open and close the valve by predetermined moving amounts respectively in one direction and the other direction near a full-close position of the valve,
 wherein the apparatus executes the sticking avoiding operation by the valve actuation unit only when an ignition OFF operation is carried out under a condition that a demand flag is in an ON state, and wherein the demand flag comes to the ON state in conjunction with the start of the engine, and comes to the OFF state in conjunction with an end of the sticking avoiding operation.

8. The valve control apparatus according to claim 7, wherein the demand flag comes to the OFF state when the to-and-fro motion of the valve to open and close the valve by the predetermined moving amount respectively in one direction and the other direction near the full-close position of the valve is continuously executed a predetermined finishing number of times.

9. The valve control apparatus according claim 8, wherein, even if an ignition ON operation is carried out during the execution of the sticking avoiding operation, the apparatus continues the sticking avoiding operation by the valve actuation unit until the operation of the engine is started.

10. The valve control apparatus according claim 7, wherein, even if an ignition ON operation is carried out during the execution of the sticking avoiding operation, the apparatus continues the sticking avoiding operation by the valve actuation unit until the operation of the engine is started.

11. The valve control apparatus according to claim 7, wherein the ignition ON operation is carried out by turning on an ignition switch, the operation of the engine in started by turning on a starter switch, and the ignition OFF operation is carried out by turning off the ignition switch.

* * * * *